United States Patent
Grube et al.

(10) Patent No.: US 8,689,354 B2
(45) Date of Patent: Apr. 1, 2014

(54) METHOD AND APPARATUS FOR ACCESSING SECURE DATA IN A DISPERSED STORAGE SYSTEM

(75) Inventors: Gary W. Grube, Barrington Hills, IL (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 619 days.

(21) Appl. No.: 12/797,165

(22) Filed: Jun. 9, 2010

(65) Prior Publication Data

US 2011/0078774 A1     Mar. 31, 2011

Related U.S. Application Data

(60) Provisional application No. 61/246,809, filed on Sep. 29, 2009.

(51) Int. Cl.
H04L 29/06     (2006.01)

(52) U.S. Cl.
USPC ............. 726/29; 726/26; 726/27; 726/28; 726/30

(58) Field of Classification Search
USPC .................................. 726/29, 26, 27, 28, 30
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A * | 11/1999 | Garay et al. | 713/165 |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 * | 2/2001 | Garay et al. | 713/165 |
| 6,256,688 B1 | 7/2001 | Suetaka et al. | |
| 6,272,658 B1 | 8/2001 | Steele et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Bradley Holder
(74) *Attorney, Agent, or Firm* — Garlick & Markison; Timothy W. Markison

(57) ABSTRACT

A method begins by a processing module receiving, from a user device, a request to access secure data, wherein the request includes a user identification code and at least one object name for the secure data. The method continues with the processing module processing the request to determine a security level associated with the user device and to determine security parameters associated with the secure data. The method continues with the processing module determining a level of access to the secure data based on the security level associated with the user device and the security parameters. The method continues with the processing module retrieving a set of encoded data slices from dispersed storage units, wherein the set of encoded data slices includes less than a reconstruction threshold number of encoded data slices and generating a response that includes the set of encoded data slices when the level of access is a partial access level.

6 Claims, 13 Drawing Sheets

(56) References Cited

U.S. PATENT DOCUMENTS

| | | |
|---|---|---|
| 6,301,604 B1 | 10/2001 | Nojima |
| 6,356,949 B1 | 3/2002 | Katsandres et al. |
| 6,363,481 B1* | 3/2002 | Hardjono ............... 713/165 |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,807,581 B1* | 10/2004 | Starr et al. ............... 709/250 |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,203,871 B2* | 4/2007 | Turner et al. ............ 714/710 |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,352,622 B2* | 4/2008 | Chiang et al. ............ 365/185.11 |
| 7,574,579 B2* | 8/2009 | Gladwin et al. ............ 711/171 |
| 7,752,403 B1* | 7/2010 | Weinman, Jr. ............ 711/162 |
| 7,953,937 B2* | 5/2011 | Gladwin et al. ............ 711/154 |
| 8,019,960 B2* | 9/2011 | Gladwin et al. ............ 711/171 |
| 8,185,614 B2* | 5/2012 | Leggette et al. ............ 709/220 |
| 8,209,363 B2* | 6/2012 | Palthepu et al. ............ 707/822 |
| 8,244,991 B2* | 8/2012 | Gladwin et al. ............ 711/154 |
| 8,261,033 B1* | 9/2012 | Slik et al. ............ 711/162 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1* | 5/2003 | Shu .................. 707/1 |
| 2004/0024963 A1 | 2/2004 | Talagala et al. |
| 2004/0122917 A1 | 6/2004 | Menon et al. |
| 2004/0128444 A1* | 7/2004 | Baek et al. ............ 711/114 |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2005/0273686 A1* | 12/2005 | Turner et al. .......... 714/752 |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0067332 A1* | 3/2007 | Gallagher et al. ............ 707/102 |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2009/0094320 A1* | 4/2009 | Palthepu et al. ............ 709/203 |
| 2010/0023524 A1 | 1/2010 | Gladwin et al. |
| 2010/0023529 A1* | 1/2010 | Gladwin et al. ............ 707/10 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): the Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

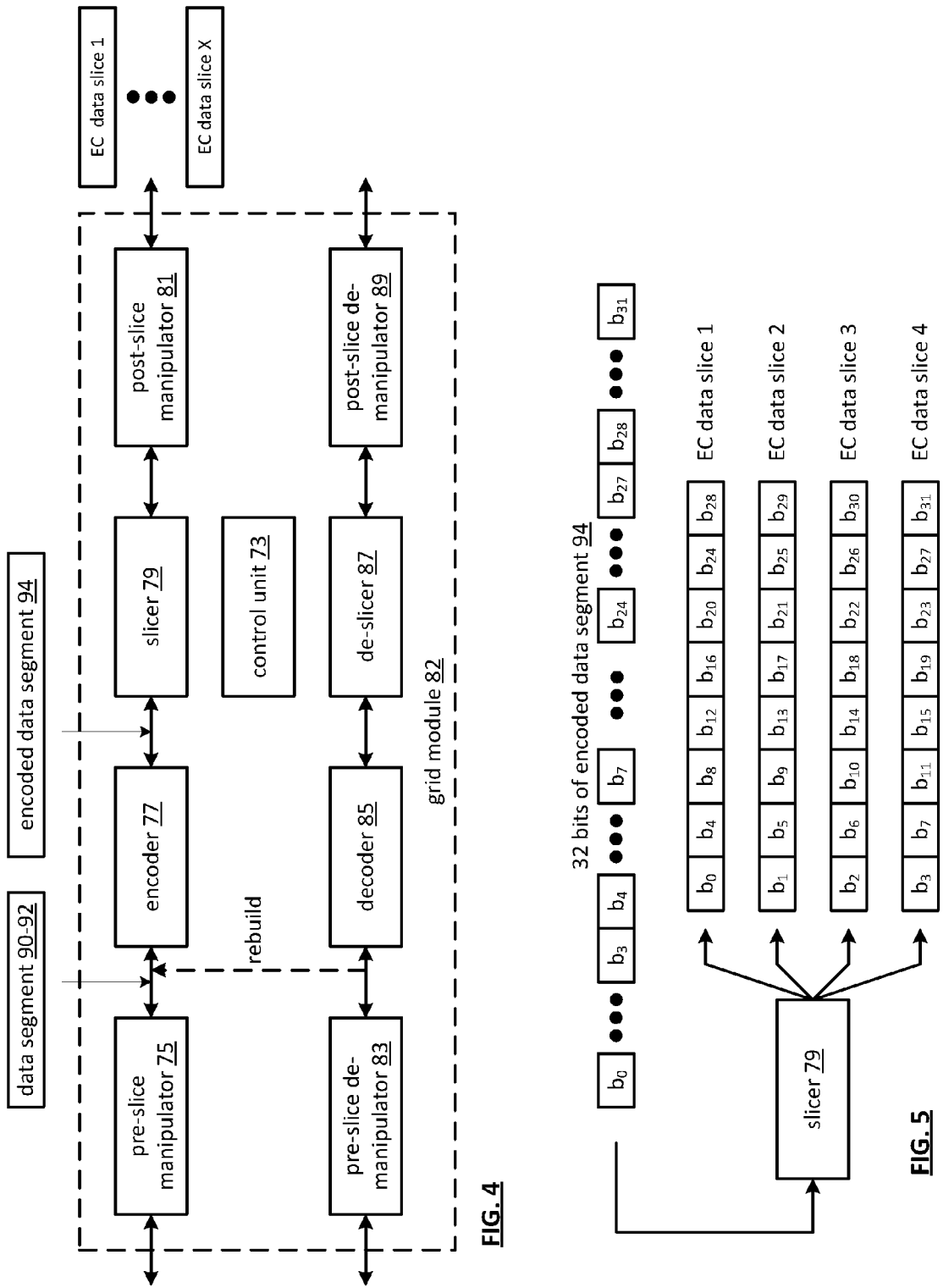

METHOD AND APPARATUS FOR ACCESSING SECURE DATA IN A DISPERSED STORAGE SYSTEM

CROSS REFERENCE TO RELATED PATENTS

This patent application is claiming priority under 35 USC §119 to a provisionally filed patent application entitled FINANCIAL TRANSACTIONS UTILIZING A DISTRIBUTED STORAGE NETWORK, having a provisional filing date of Sep. 29, 2009, and a provisional Ser. No. 61/246,809.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

DETAILED DESCRIPTION OF THE INVENTION

Figure 1:
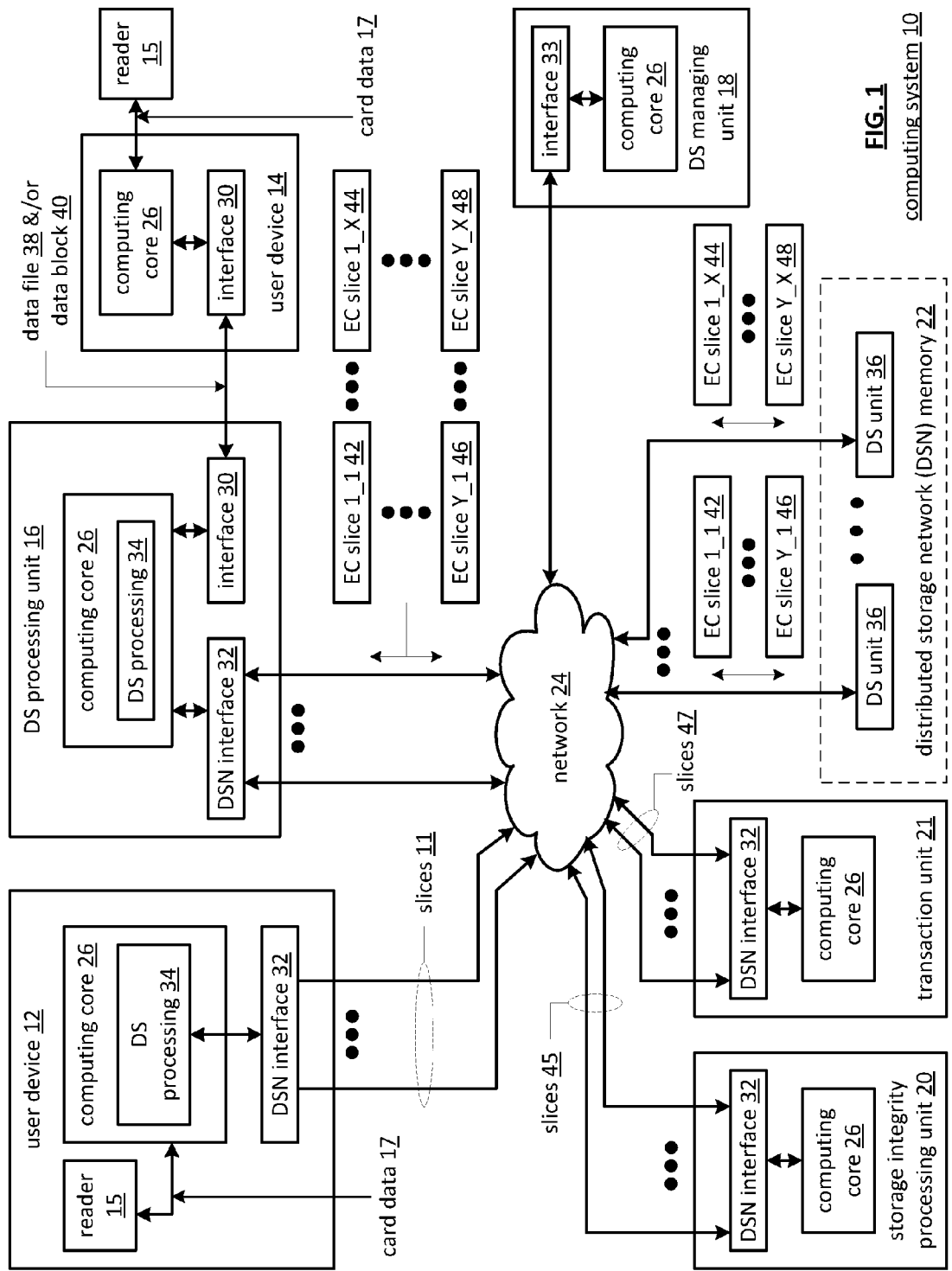
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, one or more readers 15, at least one distributed storage (DS) processing unit 16, at least one DS managing unit 18, at least one storage integrity processing unit 20, at least one transaction unit 21, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-12.

Each of the user devices 12-14, the reader 15, the DS processing unit 16, the DS managing unit 18, the storage integrity processing unit 20, and the transaction unit 21 may be a portable computing device (e.g., a point of sale terminal, a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a point of sale terminal, a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, the storage integrity processing unit 20, and/or the transaction unit 21. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. The user device 12-14 may have the reader 15 operably coupled to the computing core 26 of the user device 12-14. The reader 15 may be internal (e.g., integrated) to the user device 12 or external to the user device 14. The reader 15 functions as one or more of a credit card reader, a smart card reader, a radio frequency identifier (RFID) tag reader, and a near field communications (NFC) reader. The user device 12-14 generates a data file 38 and/or data block 40 based on card data 17 from the reader 15. The card data 17 includes credit card account information including an account number, card holder name, and/or issuer identifier.

In another instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-12.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The transaction unit 21 may include DS processing 34 to communicate slices 47 with the DSN memory 22. The transaction unit 21 may initiate the retrieval of a data file or data block from DSN memory 22 by identifying the DS units 36 storing the slices of the data file and/or data block 22. The transaction unit 21 then issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and sends the slice(s) to the transaction unit 16. Once the transaction unit 21 has received a threshold number (k) of slices for a data segment, it performs a de-slicing and error decoding function to reconstruct the data segment. The method repeats for a plurality of data segments that correspond to the data file. When Y number of data segments has been reconstructed, the transaction unit 21 processes a transaction based on the data file 38 and/or data block 40. For example, the transaction unit 21 creates processed data to authorize or complete a financial transaction based on the retrieved data file 38 and/or data block 40 (e.g., that includes card data 17). The transaction unit 21 may store the processed data in the DSN memory. As such, the transaction unit 21 encodes and slices the processed data file and/or data block and sends, via the DSN interface 32, the slices 47 to the DS units 36 for storage therein.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
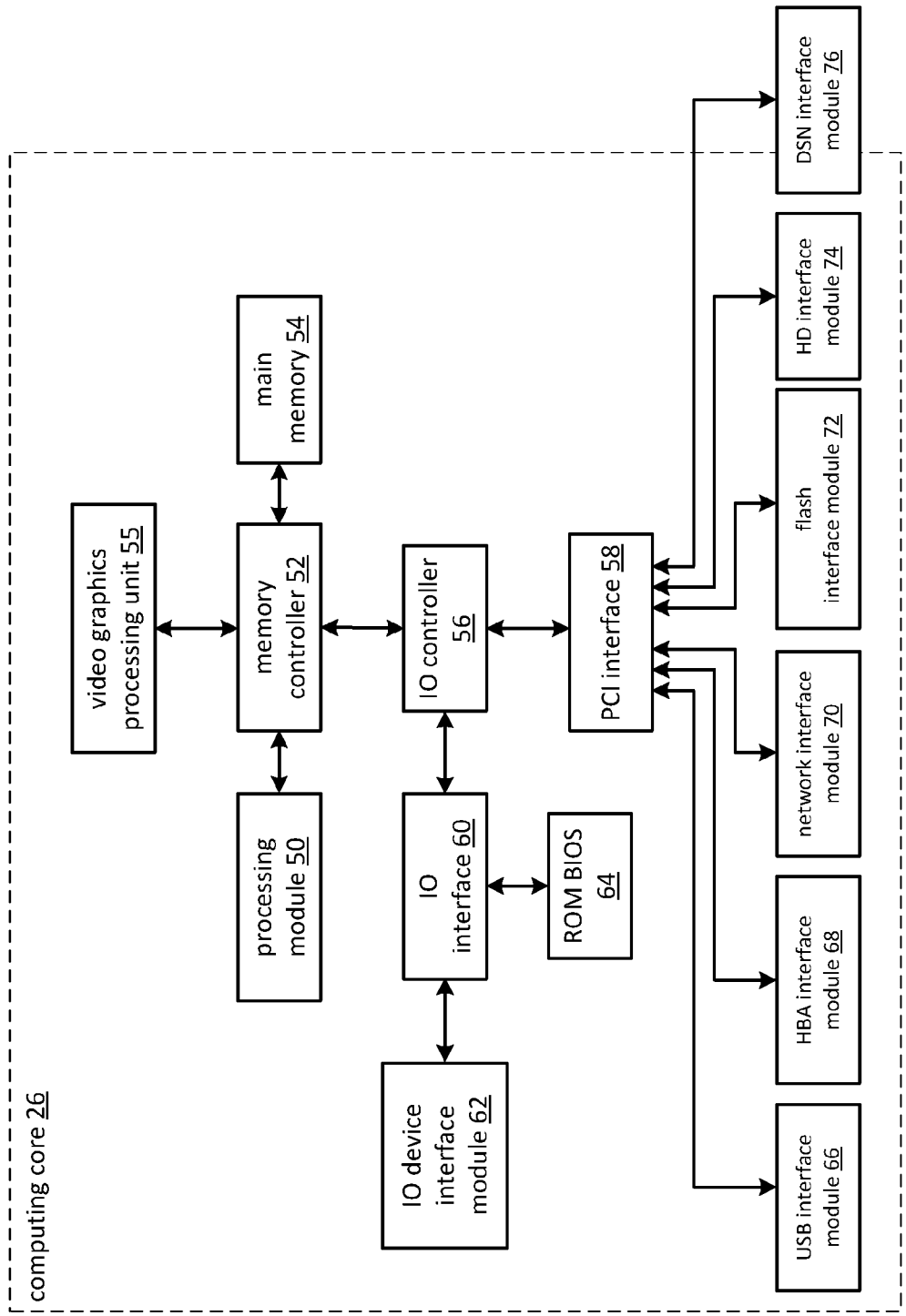
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-12.

Figure 3:
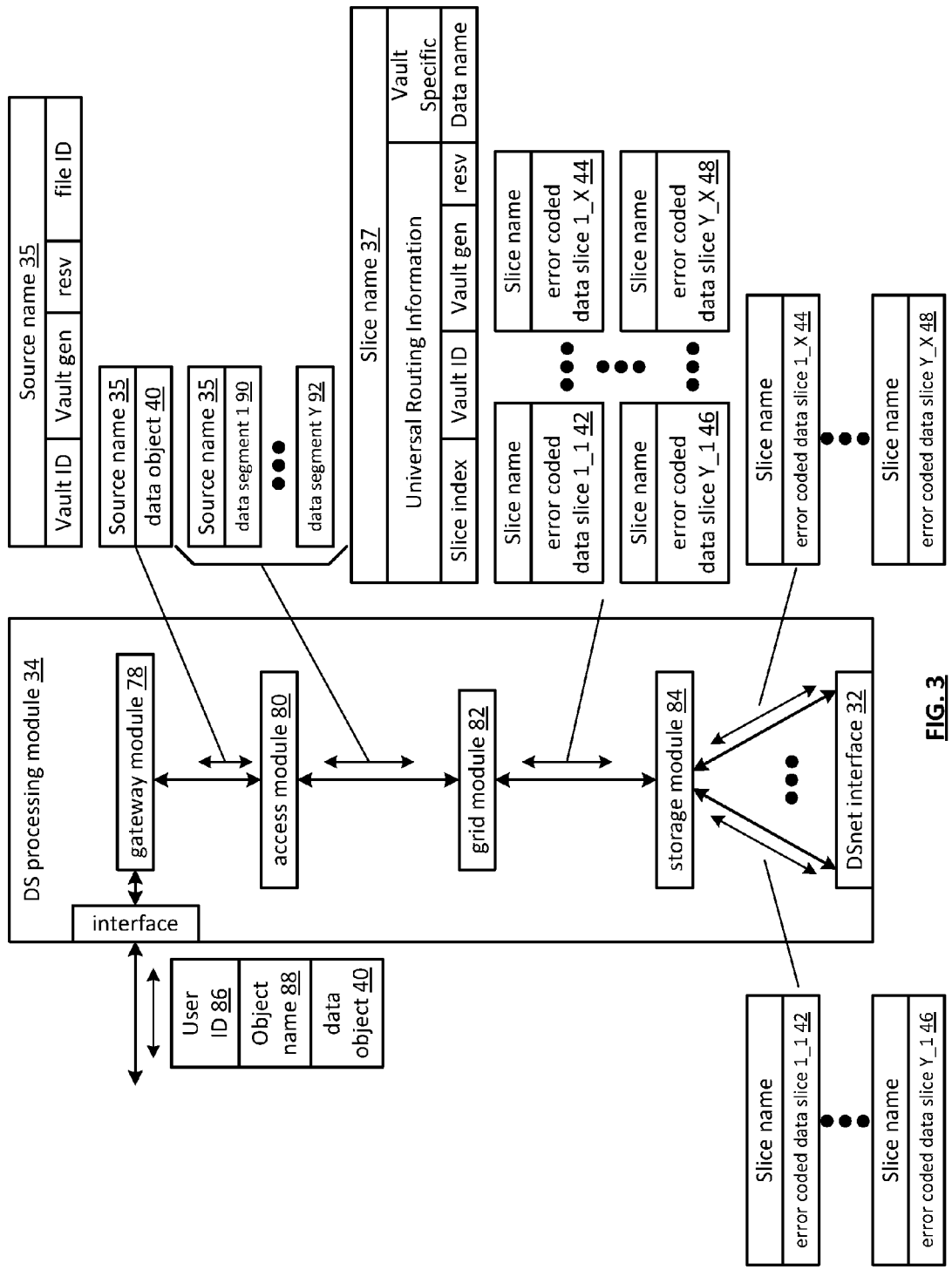
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit 36 attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module. The storage module then outputs the encoded data slices 1 through X of each segment 1 through Y to the DS storage units. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92.

For example, if the slicing parameter is X=16, then the slicer slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment.

FIG. 5 is a diagram of an example of slicing an encoded data segment 94 by the slicer 79. In this example, the encoded data segment includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
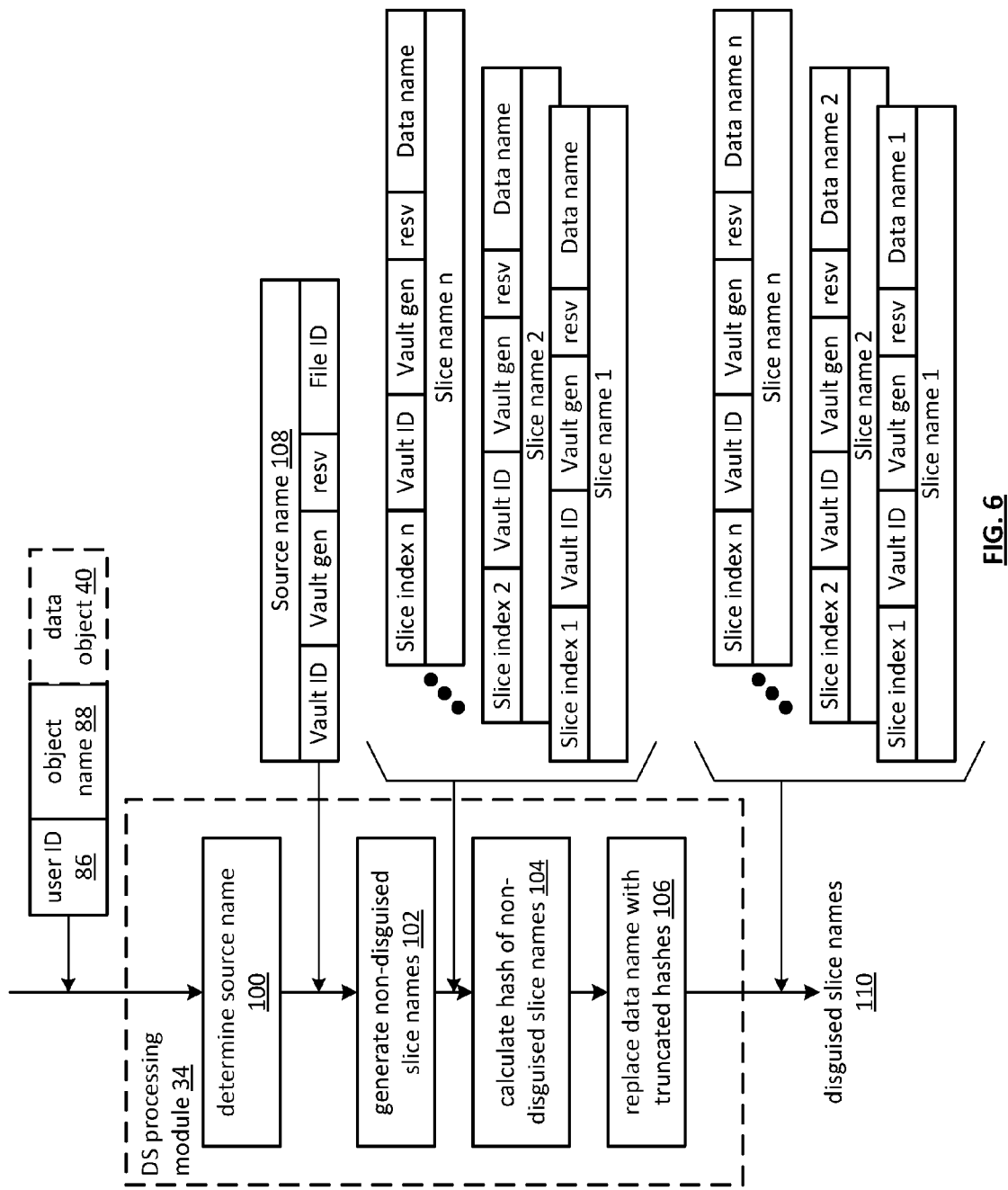
FIG. 6 is a flowchart illustrating the determination of a disguised slice name.

FIG. 6 is a flowchart illustrating the determination of a disguised slice name 110 by processing module of the DS processing such that the file ID is not transparent in the data name portion of the slice name. The method begins with the step where the processing module receives the user ID 86, object name 88, and data object 40 (e.g., for a store to the DSN scenario). The method continues at step 100 where the processing module determines the source name 108 such that a new file ID is created if one does not already exist for this user and object name. The processing module checks a user vault for this user to determine if the object name is affiliated with a previously assigned file ID. If so, the processing module utilizes the same file ID and if not, the processing module creates a new file ID and saves the new file ID in the user vault for this user. The processing module may create the file ID as one or more of a random number, an encryption operation of the object name, and/or a hash operation (e.g., cyclic redundancy check) of the object name. Note that the source name is the same for every slice of the same data object. The processing module creates one or more data segments based on the data object. The processing module encodes the data segment in accordance with an error coding dispersed storage function to produce a plurality of error coded data slices.

The method continues with step 102 where the processing module generates a slice name for an error coded data slice of the plurality of error coded data slices, wherein the slice name includes a dispersed storage routing information section and a data identification section. Note that the data identification section comprises identification of the data segment and the data object, wherein the data segment is one of a plurality of data segments of the data object. Further note that the slice index is based on the pillar number and vault ID. Further note that the data name is based on the file ID and segment number such that the data name is the same (e.g., when not disguised) in slice names across slices of the same segment.

The method continues with step 104 where the processing module performs a securing function on at least the data identification section to produce a secure data identification section. Note that the securing function may include performing a deterministic mathematical function on some portion or all of the slice name. Further note that the deterministic mathematical function includes one or more of but not limited to a hash function, encryption, adding/subtracting an offset value, and scrambling. For example, the processing module performs the deterministic mathematical function by encrypting a portion of the non-disguised slice name utilizing an encryption key where the encryption key is a fixed key (e.g., retrieved from memory) or is derived from one or more elements of the slice name. In another example, the processing module calculates a hash (e.g., cyclic redundancy check) of non-disguised slice names. Note that the hash shall produce a result that may be at least as wide (e.g., in bytes) as the data name field (e.g., 24 bytes), and less than the slice name width (e.g., 48 bytes). For example, secure hash algorithm (SHA)-256 may be utilized to produce a 32 byte result. Note that the hash function generates the same number for the same input but is difficult to produce the original number based on the hash result. The processing module truncates the hash to the size of the data name field (e.g., 24 bytes).

The method continues with step 106 where the processing module replaces, within the slice name, the data identification section (e.g., the data name) with the secure data identification section (e.g., the truncated hashes) to produce a secure slice name. For example, the processing module replaces the data name field of the corresponding slice name with the hash to produce a disguised slice name 110.

The method continues with the processing module generating a unique data name for remaining ones of the plurality of error coded data slices to produce a plurality of slice names. For example, the processing module additionally secures the slice names for each of at least a pillar width minus a decode threshold number of the plurality of slice names by performing a securing function on at least the data identification section to produce a secure data identification section. Next, the processing module replaces the data identification section with the secure data identification section. The disguised slice names 110 may be utilized to store and retrieve EC data slices from the DSN memory. Note that the original object name is required to identify EC data slices that are formed from the same data segments and data object 40 in a retrieval sequence.

In an example of operation, the processing module processes an access request to a data object where at least some of the slice names were previously secured utilizing the method described above. The method begins with the step where the processing module receives an access request to a data object. The processing module determines one or more required data segments to reconstruct the data object wherein each data segment is encoded in accordance with an error coding dispersed storage function to produce a plurality of error coded data slices that are stored in a plurality of DS storage units. The method continues with the step where the processing module generates a slice name for an error coded data slice of the plurality of error coded data slices, wherein the slice name includes a dispersed storage routing information section and a data identification section.

The method continues with the step where the processing module performs a securing function on at least the data identification section to produce a secure data identification section. The processing module replaces, within the slice name, the data identification section with the secure data identification section to produce a secure slice name. The method continues with the step where the processing module accesses the error coded slice based on the secure slice name. The method continues with the step where the processing module generates slice names for remaining ones of the plurality of error coded data slices to produce a plurality of slice names. The processing module secures the slice names to produce secure slice names for each of at least a decode threshold minus one number of the plurality of slice names by performing a securing function on at least the data identification section to produce a secure data identification section. Next, the processing module replaces the data identification section with the secure data identification section. The method continues with the step where the processing module accesses the remaining ones of the plurality of error coded data slices based on the secure slice names.

Figure 7:
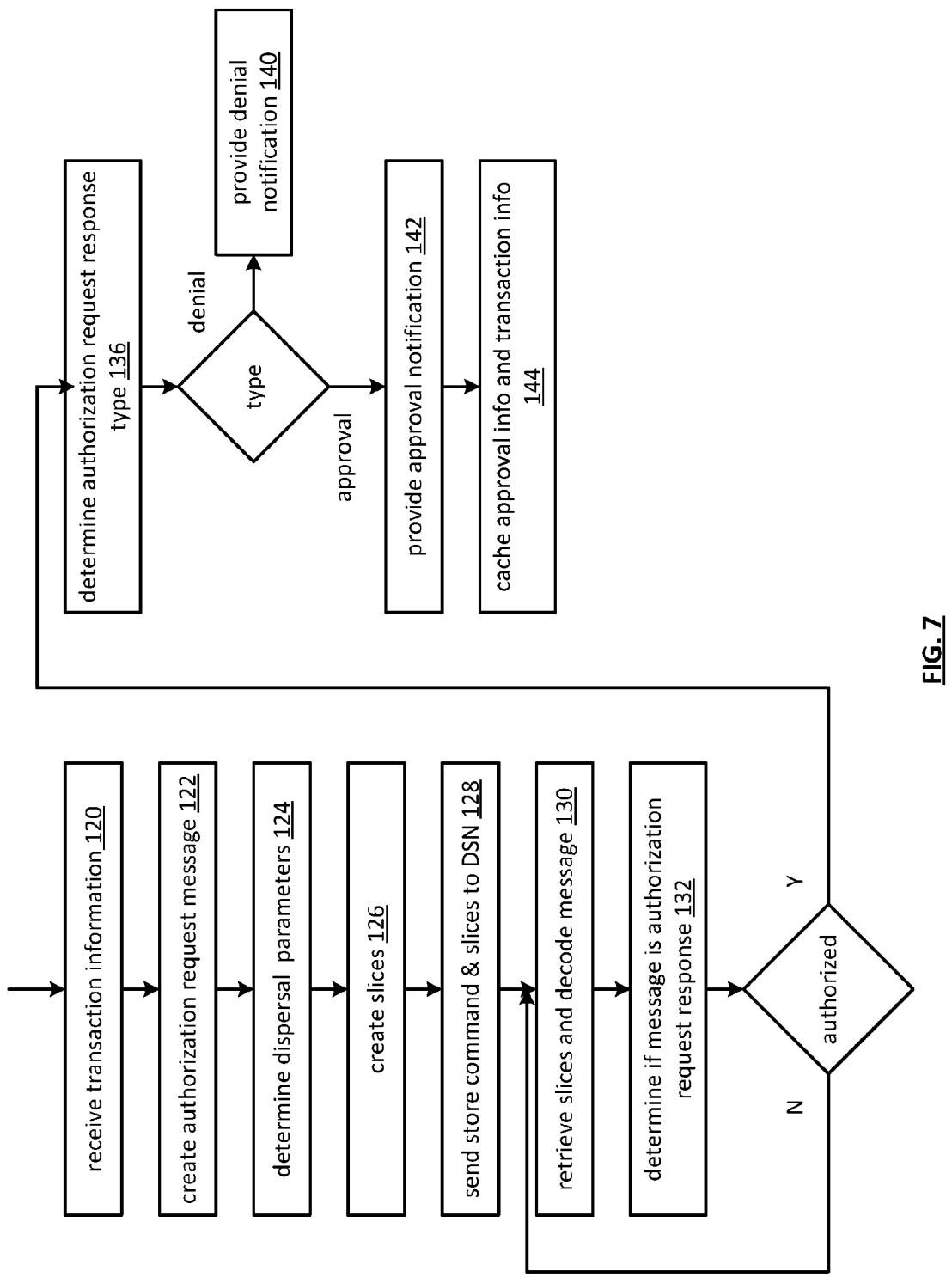
FIG. 7 is a flowchart illustrating the creation and storage of an authorization request and the retrieval and processing of an authorization request response.

FIG. 7 is a flowchart illustrating the creation and storage of an authorization request and the retrieval and processing of an authorization request response 134 by a processing module of the user device (e.g., a point of sale terminal) and/or DS processing unit. These two steps may comprise the authorization sequence for a purchasing transaction where a credit card is utilized to execute a purchase.

The method begins with step 120 where the processing module receives transaction information 120 from one or more financial transaction applications. For example, the processing module receives account information regarding an electronic-commerce transaction. In an instance, the processing module may execute a credit card transaction application implemented on the computing core of the point of sale terminal user device. The user device may have previously formed the transaction information based on the credit card data, an amount of the transaction (e.g., currency type and amount), a merchant identifier (e.g., a unique number associated with the merchant executing the transaction), and a transaction number (e.g., a unique reference number of the transaction).

The method continues with step 122 where the processing module creates an authorization request message by generating a transaction authorization request message based on one or more of the account information, the transaction information, and merchant information. The method continues with step 124 where the processing module determines dispersal parameters to dispersedly store the authorization request message in the DSN memory. The dispersal parameters may include the error coding parameters, security parameters, whether to disguise the slice names (and the method), slice transmission ordering, whether to inject random slices (e.g., to confuse a hacker), and/or which DS units to send the slices to for storage therein. The dispersal parameters may be assigned by the DS managing unit utilizing one or more scenarios of at least a portion of a vault for the merchant, a vault for the card holder, a vault for a card issuer, a vault for an authorization agent, and/or a vault for authorization requests. The processing module determines which DS units to send the slices to with a store command based on the virtual DSN address (e.g., un-disguised slice name) to physical location (DS unit) table, a vault assignment, and/or in accordance with an authorization protocol. Note that the authorization protocol may indicate a plurality of DS units to be utilized to pass information back and forth between a point-of-sale user device terminal 12 and the transaction unit 21 or an authorization server.

The method continues with step 126 where the processing module encodes the transaction authorization request message in accordance with an error coding dispersed storage function to produce a plurality of encoded data slices. The method continues in step 128 where the processing module outputs the plurality of encoded data slices to a plurality of dispersed storage units in accordance with the authorization protocol. The processing module may send the slices as a batch to one DS unit at a time or may send one slice at a time to different DS units. In other words, the processing module may generate a plurality of write messages such that each write message includes a slice name and a corresponding error coded data slice. Note that the slice name includes dispersed storage routing information and a transaction name. Further note that the routing information identifies dispersed storage units associated with the authorization server and the transaction name identifies the transaction authorization request message.

Alternatively or in addition to outputting the plurality of encoded data slices to a plurality of dispersed storage units, the processing module may output a message to the authorization server regarding the transaction authorization request message in accordance with the authorization protocol such that the authorization server may subsequently (e.g., immediately) retrieve the plurality of encoded data slices.

In addition, the processing module may embed the transaction authorization request message (e.g., data content for secure data content transmission) into a data stream (e.g., wherein the data stream comprises at least one of null data, at least one pre-defined data file, random data, calculated data based on one or more of account information, transaction history information, and merchant information) to produce a stream of data. Next, the processing module sequentially encodes data segments of the stream of data in accordance with the error coding dispersed storage function to produce pluralities of encoded data slices. The processing module outputs the pluralities of encoded data slices to a plurality of dispersed storage units for storage therein. Note that sending the slices as described above, even if over a common link to the network, improves the security of the system.

The transaction unit 21 periodically retrieves slices for the same object name from the same DS units that the processing module utilized as described in the method above to store the authorization request message. The transaction unit creates an authorization request response and stores it in the DSN memory for the user device (e.g., point of sale terminal) to retrieve. The method of the transaction unit 21 is described in greater detail with reference to FIG. 8.

The method continues with step 130 and the processing module retrieves at least a threshold number of encoded data response slices from the plurality of dispersed storage units and decodes the message. The processing module generates a plurality of read messages and sends the plurality of read messages to the DS units in accordance with the authorization protocol (e.g., which DS units). Note that each read message includes a slice name such that the slice name includes dispersed storage routing information and a transaction response name. Further note that the dispersed storage routing information identifies dispersed storage units associated with an authorization server (e.g., the transaction unit 21), and the transaction response name identifies the response message. The processing module receives at least a threshold number of encoded data response slices from the plurality of dispersed storage units in accordance with the authorization protocol. The processing module decodes the plurality of encoded data response slices in accordance with the error coding dispersed storage function to produce a response message.

The method continues with step 132 where the processing module determines if the decoded message contains an authorization request response for this transaction. The method repeats back to step 130 the processing module determines that the message is not the authorization request response for this transaction. The method continues to the next step when the processing module determines that the message is the authorization request response for this transaction.

The method continues with step 136 where the processing module determines the authorization request response type when the processing module determines that the response has been decoded. The processing module determines the authorization request response type based on a comparison of the response to a list of potential responses. The method ends with step 140 where the processing module provides a denial notification when the processing module determines that the authorization request response type is a denial message. The denial notification may include a visual indicator and/or a message provided to the financial transaction such that the message indicates the denial notification. The method continues to the next step when the processing module determines that the authorization request response type is an approval type.

In the next step 142, the processing module provides an approval notification when the DS processing unit determines the response type as an approval. The approval notification may include a visual indicator and/or a message provided to the financial transaction where the message indicates the approval notification. Note that the financial transaction application may complete the sale and the merchant would release the goods and/or services.

The method continues with step 144 where the processing module appends the approval to the transaction information to form authorized transaction information. The processing module caches the authorized transaction information such that the processing module may subsequently (e.g., at the end of the day) create a settlement request and process it based on the authorized transaction information. The settlement request is discussed in greater detail with reference to FIGS. 9-10.

Figure 8:
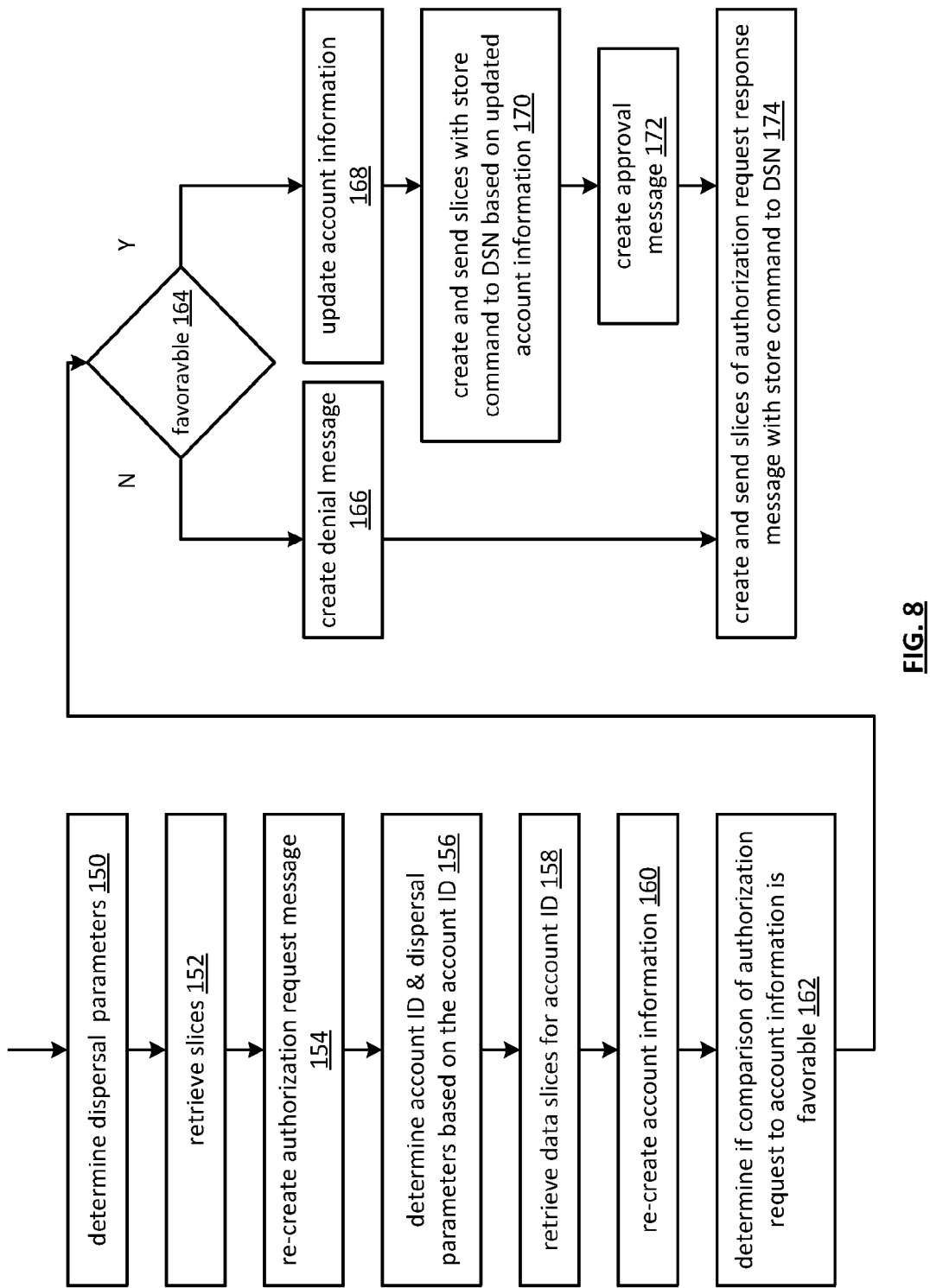
FIG. 8 is a flowchart illustrating the retrieval and processing of an authorization request and the creation and storage of an authorization request response.

FIG. 8 is a flowchart illustrating the retrieval and processing of an authorization request and the creation and storage of an authorization request response by the transaction unit 21. These two steps may comprise the authorization sequence for a purchasing transaction where a credit card is utilized to execute a purchase.

The transaction unit determines dispersal parameters 150 to retrieve the distributed authorization request message from the DSN memory. The dispersal parameters may include the error coding parameters, security parameters, if the slice names are disguised (and the method), slice transmission ordering, whether random slices may exist, and/or the DS units to retrieve the slices 152 from. The dispersal parameters may be assigned by the DS managing unit utilizing one or more scenarios of at least a portion of a vault for the merchant, a vault for the card holder, a vault for a card issuer, a vault for an authorization agent, and/or a vault for authorization requests. The transaction unit determines the object name for the authorization request. The object name may be pre-determined or distributed periodically by a unit of the system (e.g., the DS managing unit). The transaction unit determines which DS units to retrieve the slices from with the retrieve command based on the virtual DSN address (e.g., un-disguised slice name) to physical location (DS unit) table and the vault assignment for this scenario.

The transaction unit retrieves the slices and re-creates the authorization request 154 by de-slicing and decoding the slices. The transaction unit determines the account ID based on the authorization request (e.g., part of the transaction information). The transaction unit determines the dispersal parameters associated with the storage of account information (e.g., credit limits, transaction history, credit card account balance) for the account ID 156. The account information may be in a vault linked to one or more of the account holder, the card issuer, an authorizing agent, and/or a vault for account information.

The transaction unit retrieves the slices for the account information of the account ID 158. The transaction unit re-creates the account information 160 by de-slicing and decoding the slices. The transaction unit determines if a comparison of the authorization request to the account information is favorable 162. The determination may be based on one or more of the current account balance, the credit limit, the amount of the transaction, the type of purchase, and/or the location of the purchase. For example, the comparison is favorable 164 when the current balance plus the transaction amount is less than the credit limit.

The transaction unit creates a denial message when the comparison of the authorization request to the account information is not favorable. The transaction unit generates the denial authorization request response message 166. The transaction unit determines the object name, slice names, and DS unit locations associated with the response. The transaction unit creates and sends slices of the response for storage in the DSN memory 170. Note that the user device retrieves the response message from these slices as described with reference to FIG. 7.

The transaction unit updates the account information (e.g., replaces the account balance with the transaction amount and the old account balance) when the comparison of the authorization request to the account information is favorable 162. The transaction unit creates and sends slices with the store command to the DSN 170 units (e.g., as determined previously for the account information) based on the updated account information. The transaction unit creates the approved authorization request response message 172. The transaction unit determines the object name, slice names, and DS unit locations associated with the response. The transaction unit creates and sends slices of the response for storage in the DSN 174 memory. Note that the user device retrieves the response message from these slices as described with reference to FIG. 7.

Figure 9:
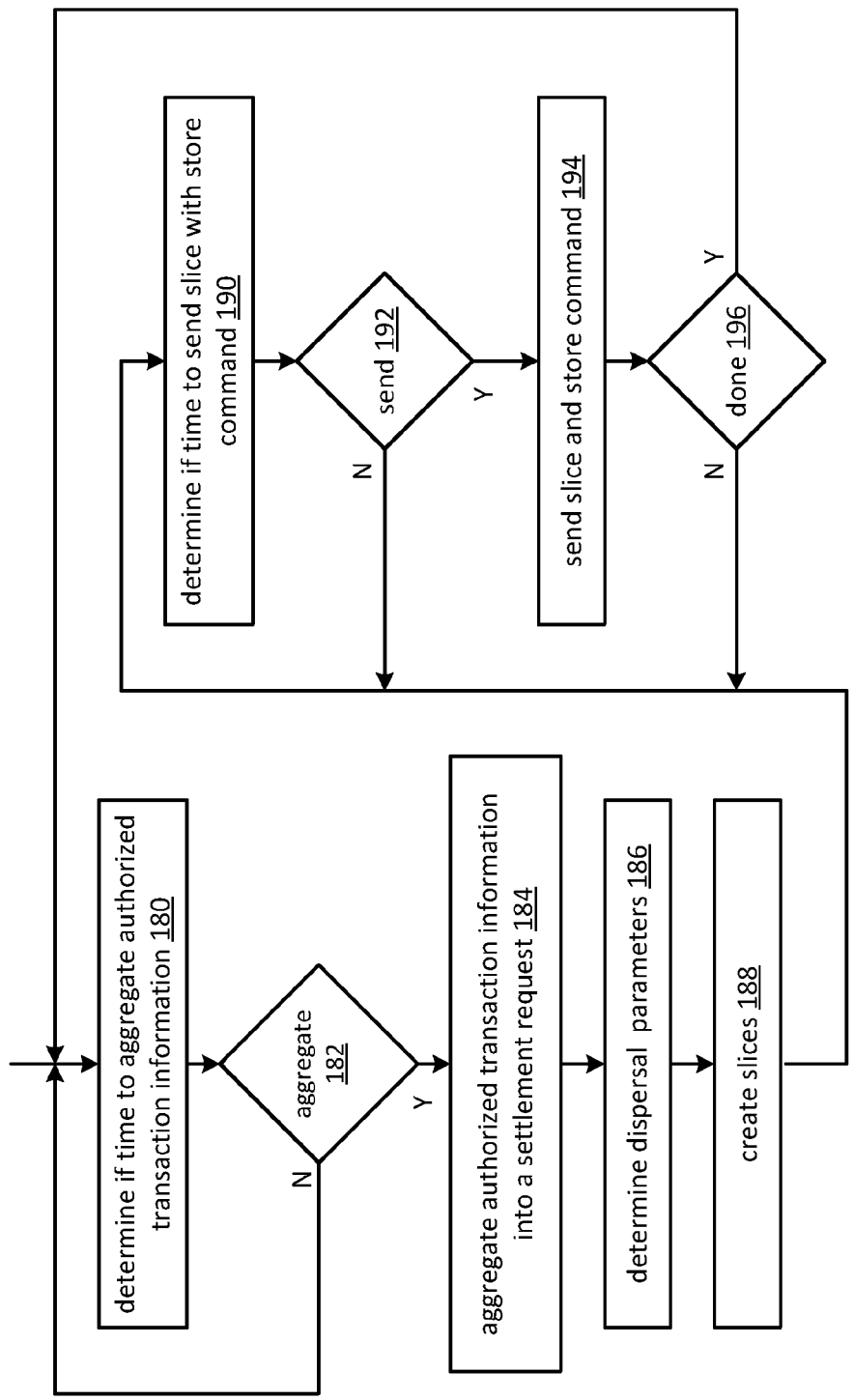
FIG. 9 is a flowchart illustrating the creation and storage of a settlement request.

FIG. 9 is a flowchart illustrating the creation and storage of a settlement request by the user device (e.g., a point of sale terminal) and/or DS processing unit. This method may be utilized to complete the settlement of a previously authorized transaction.

The DS processing unit determines if it's time to aggregate authorized transaction information 180 that was previously cached by the user device and/or DS processing unit. The determination may be based on executing the aggregation from time to time, in response to a request, and/or any time settlements are desired.

The DS processing unit aggregates the authorized transaction information into a settlement request 184. The aggregation may include one or more authorized transaction information sets (e.g., from one or more transactions). The DS processing unit determines the dispersal parameters for the settlement request that mimics the determination of the dispersal parameters 186 for the authorization request. The dispersal parameters for the settlement request may utilize a different object name to differentiate it from the authorization request.

The DS processing unit creates the slices 188 based on the settlement request and dispersal parameters. The DS processing unit determines if it is time to send a slice with a store command 190. The DS processing unit may send 192 a portion of the slices at any one time to further enhance the security of the system. The determination to send may be based on one or more of a time schedule, a priority indicator, a security indicator, and/or any other indicator to improve the security of the system. The DS processing unit sends the slice and store command 194 to the DS unit when the DS processing unit determines it is time to send a slice.

The DS processing unit determines if it is done 196 sending all the slices. The DS processing unit returns to determine if it is time to send a slice when it is not done 196 sending slices. The DS processing unit returns to determine if it is time to aggregate authorization transaction information when it is done 196 sending slices.

Figure 10:
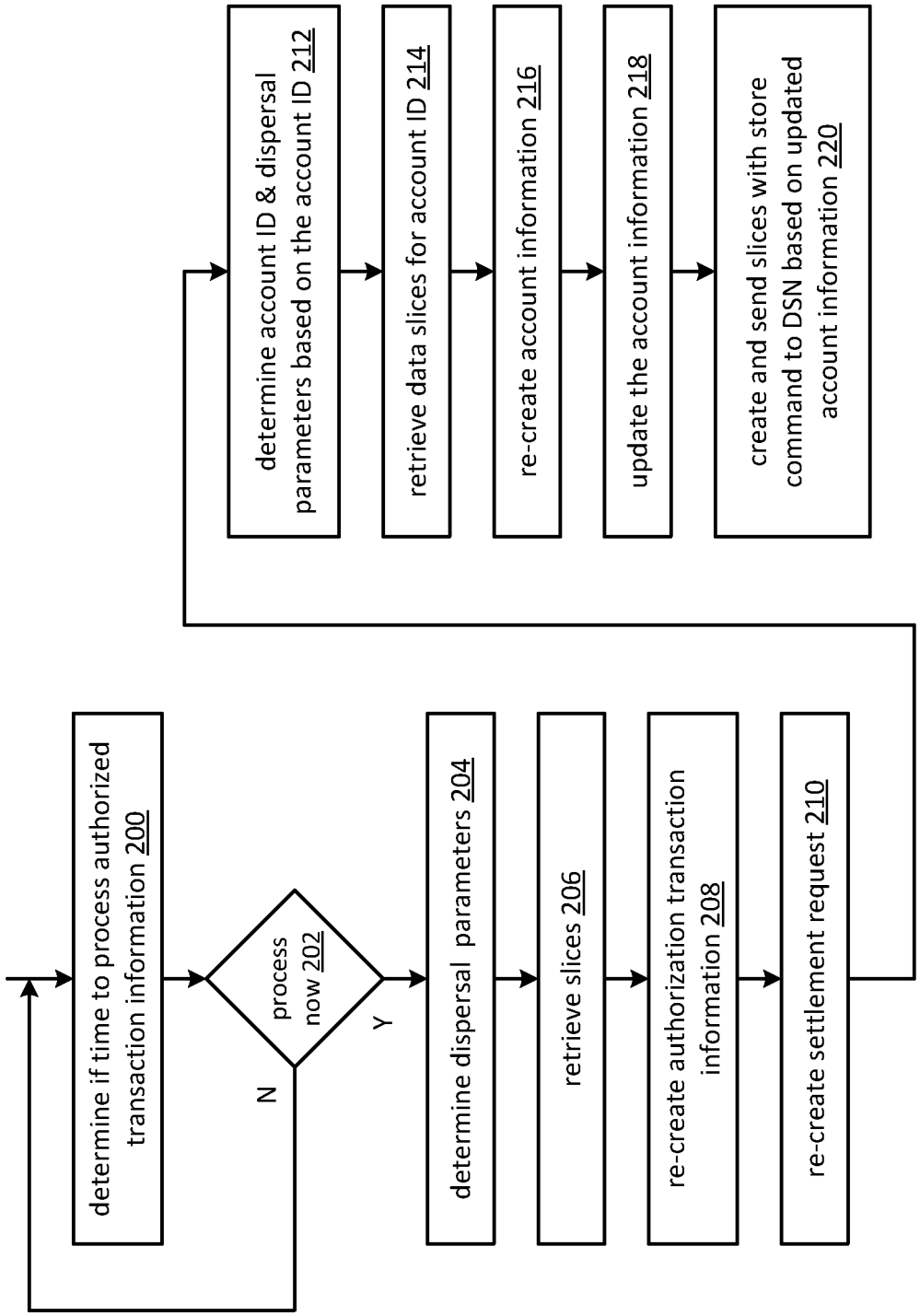
FIG. 10 is a flowchart illustrating the retrieval and processing of a settlement request.

FIG. 10 is a flowchart illustrating the retrieval and processing of a settlement request by the transaction unit. This method may be utilized to complete the settlement of a previously authorized transaction.

The transaction unit determines if it is time to process authorized transaction information 200. The determination may be based on one or more of a time period elapsing since the last processing, a request, an activity indicator, and/or any other stimulus that may invoke the processing.

The transaction unit determines the dispersal parameters when the transaction unit determines it is time to process authorized transaction information 200. The determination may mimic that previously discussed when the user device determined the dispersal parameters 204 to store the settlement request in the DSN memory. The transaction unit retrieves the slices 206 from the DS units, de-slices, and decodes the authorized transaction information and settlement request in accordance with the dispersal parameters.

The transaction unit determines the account ID based on the settlement request (e.g., part of the transaction information). The transaction unit determines the dispersal parameters 204 associated with the storage of account information (e.g., credit limits, transaction history, credit card account balance) for the account ID. The account information may be in a vault linked to one or more of the account holder, the card issuer, an authorizing agent, and/or a vault for account information.

The transaction unit retrieves the slices for the account information of the account ID 214. The transaction unit re-creates the account information 216 by de-slicing and decoding the slices. The transaction unit updates the account information 218 (e.g., debits the new authorized transaction to the outstanding balance due) by creating and sending slices with the store command to the DSN units 220 (e.g., as determined previously for the account information). Note that in a similar fashion the transaction unit may create a credit message (e.g., containing the merchant ID, amount, transaction number), determine dispersal parameters unique to sending the credit message, create the slices, and send the slices with a store command to the DSN memory.

Figure 11:
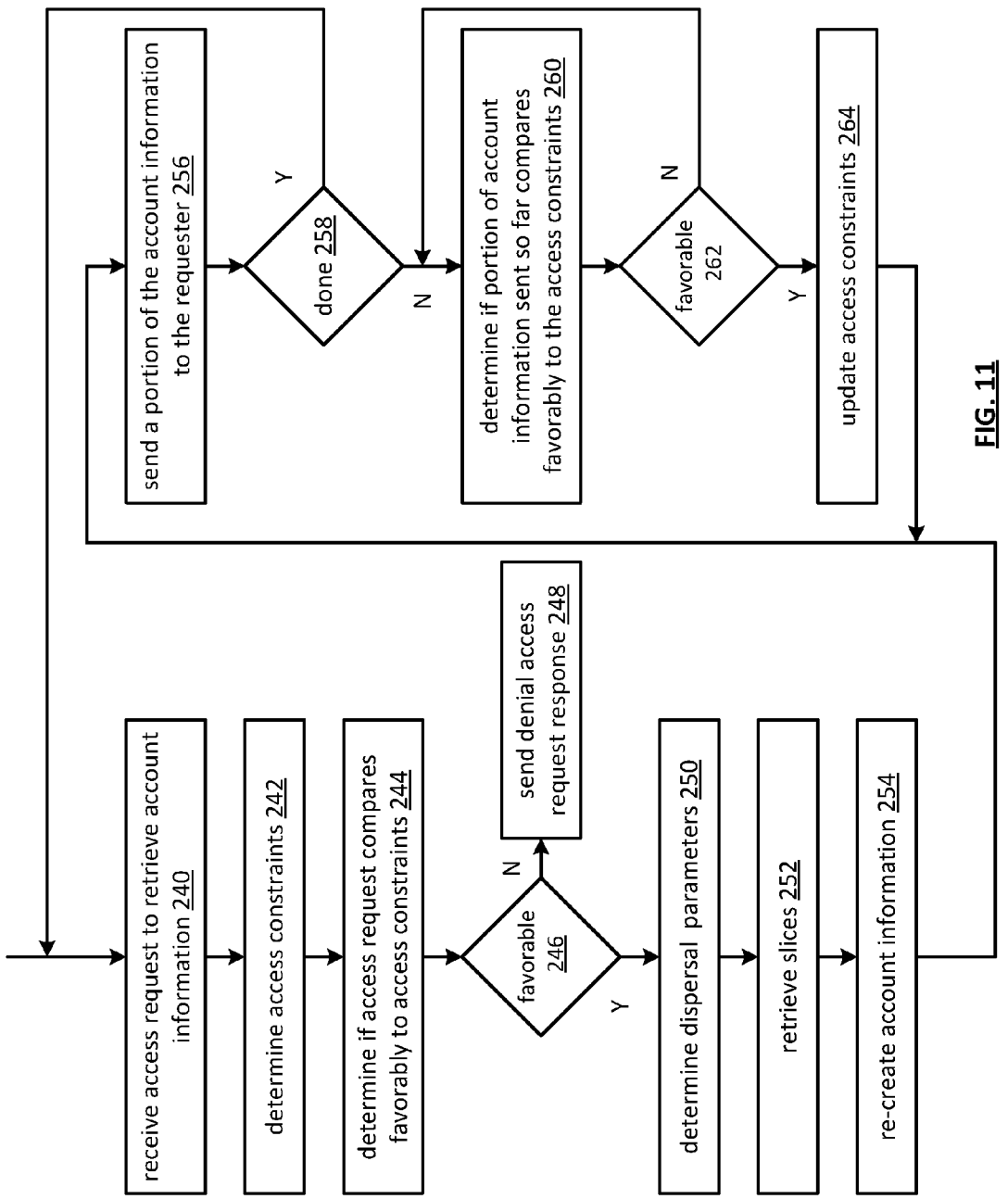
FIG. 11 is a flowchart illustrating the retrieval of account information.

FIG. 11 is a flowchart illustrating the retrieval of account information where a processing module of the transaction unit and/or DS processing unit may control the access to account information. The account information is previously stored in the DSN memory and may include thousands and even millions of records containing the account identifiers (e.g., credit card numbers), credit limits, account balances, security information, card holder name, card holder address, card holder social security numbers, and other card holder personal information.

The transaction unit receives an access request to retrieve account information 240 from a requester (e.g., a user device or any other entity that is not authorized to directly access the DSN memory any may not have the necessary dispersal information to acquire the distributed data containing account information). The access request may include one or more of a requester ID, requester credentials (e.g., a public key signed certificate, and/or a login and password), and/or the account information identifier(s) (ID).

The transaction unit determines access constraints 242 based on the account information ID. The determination may be based on retrieving the access constraints from the DSN memory for the account ID and/or retrieving the access constraints from the DSN memory for multiple accounts (e.g., constraints for accounts of the same card issuer or other similarity).

The access constraints specify acceptable scenarios for access to the account information and may include one or more of a list of authorized requesters, authorized requester credentials, which portions of the account information are accessible, restrictions on the maximum volume of account information (e.g., only access one thousand records at a time), restrictions on the minimum time between accessing the different portions of the account information (e.g., 60 minutes must pass between retrieving blocks of 1000 records), and/or the access history.

The transaction unit determines if the access request compares favorably with the access constraints 244. For example, a favorable 246 comparison is determined if the requester ID and requester credential match the authorized requester and authorized requester credentials (e.g., retrieved from the access constraints) and the account information requested is less than the maximum volume and the access history indicates that time since the last access is greater than the minimum time between accessing the account information constraint.

The transaction unit sends a denial access request response 248 to the requester when the transaction unit determines that the access request does not compare favorably with the access constraints.

The transaction unit determines the dispersal parameters 250, retrieves the slices 252, decodes the data and re-creates the account information 254 when the transaction unit determines that the access request compares favorably with the access constraints.

The transaction unit sends a portion of the account information to the requester 256. The portion may be limited by the access constraints in size and frequency of sending portions. For example, the request may be for account information records for ten thousand account IDs but the access constraints limit the transfers to the requester to five hundred records in one portion and the portions must be spaced apart by at least thirty minutes.

The transaction unit may check for further requests to retrieve account information when the last portion sent completed the request. The transaction unit may determine if the portion(s) of account information sent so far compares favorably to the access constraints 260 when the last portion sent did not complete the request. For example, an unfavorable comparison may exist when the proper amount of time may not have elapsed since the last portion was sent to allow sending the next portion. In another example of an unfavorable comparison, the requester ID may not be allowed to access more account information. Note that in such a fatal scenario the process may stop. The transaction unit will continue to check the conditions when the comparison is not favorable 262 (e.g., and not fatal).

The transaction unit may update the access constraints 246 when the transaction unit determines if the portion(s) of account information sent so far compares favorably to the access constraints. For example, the update increments the tracking of the portions of the account information sent and at what time. The transaction unit continues to send the next portion of the account information to the requester.

Figure 12:
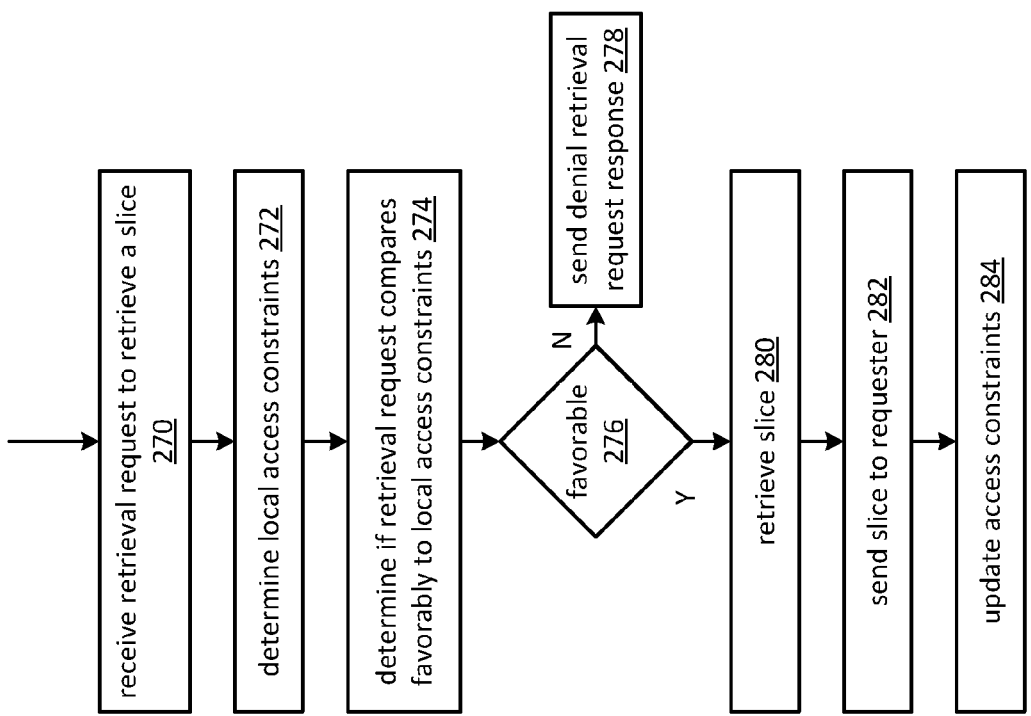
FIG. 12 is a flowchart illustrating the retrieval of information.

FIG. 12 is a flowchart illustrating the retrieval of information where the DS unit and/or DS processing may control the access to slices containing account information. The account information is previously stored in the DSN unit.

The DS unit receives a retrieval request to retrieve a slice 270 from a requester (e.g., a user device or any other entity). The retrieval request may include one or more of a slice name, a requester ID, requesting device ID, requester credentials (e.g., a public key signed certificate, and/or a login and password), and/or the account information identifier(s) (ID).

The DS unit determines local access constraints 272 based on the slice name. The determination may be based on retrieving the local access constraints from DS unit memory and/or the DSN memory for the slice name. Slices may be tracked that are affiliated with each other (e.g., slices of the same segment, block, or file) such that limits are placed on accessing affiliated slices.

The local access constraints specify acceptable scenarios for access to the slice and may include one or more of a list of authorized requesters and devices, authorized requester credentials, which slices are accessible, restrictions on the maximum volume of slices (e.g., only access one thousand slices at a time), restrictions on the minimum time between accessing affiliated slices (e.g., 60 minutes must pass between retrieving 1000 slices that affiliated to the same data object), and/or the access history.

The DS unit determines if the retrieval request compares favorably with the local access constraints 274. For example, a favorable 276 comparison is determined if the device ID and requester credential match the authorized requester and authorized requester credentials (e.g., retrieved from the local access constraints) and the number of slices requested is less than the maximum volume and the access history indicates that time since the last retrieval is greater than the minimum time between accessing the slices (e.g., affiliated slices).

The DS unit sends a denial retrieval request response 278 to the requester when the DS unit determines that the retrieval request does not compare favorably with the local access constraints.

The DS unit retrieves the slice 280 when the DS unit determines that the retrieval request compares favorably with the local access constraints. The DS unit sends the slice to the requester 282. The DS unit may update the local access constraints 284. For example, the update increments the tracking of slices sent and at what time. Slices may be tracked that are affiliated with each other (e.g., slices of the same segment, block, or file).

Figure 13:
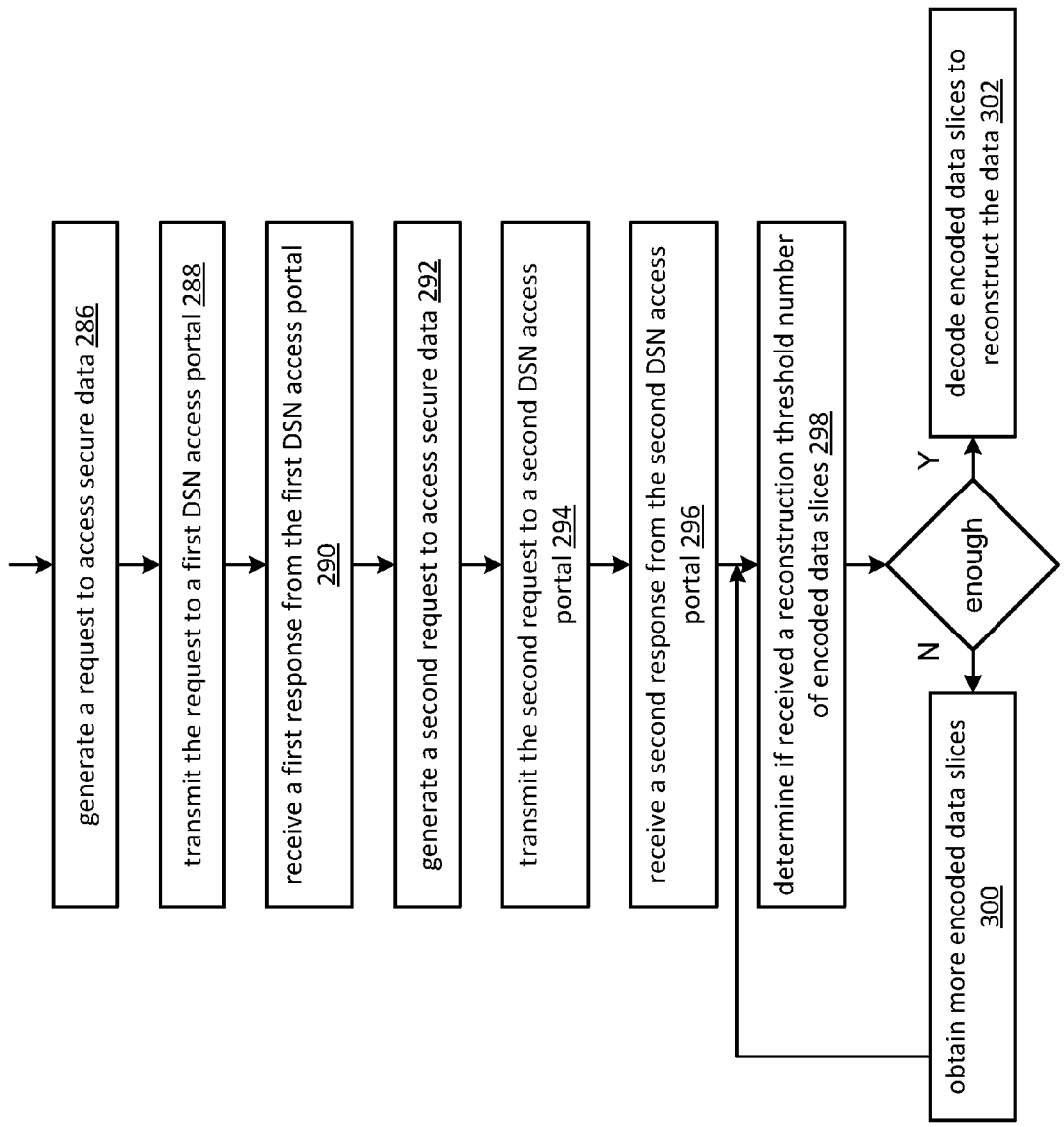
FIG. 13 is a flowchart illustrating secure access of dispersedly stored data by a processing module.

FIG. 13 is a flowchart illustrating secure access of dispersedly stored data by a processing module. The processing module may be implemented in a user device, a DS processing unit, a DS managing unit, a storage integrity processing unit, the transaction unit, and/or a DS unit. For example, the processing module is implemented in the user device. The method begins with step 286 where the processing module generates a request to access secure data. The secure data may include sensitive information that should only be accessed by authorized entities. The secure data may include one or more of but not limited to financial account information including credit card information, savings account information, checking account information, historical records, retirement account information, stock transaction information, and credit information. The request includes a user identification code (ID) and at least one object name for the secure data. The secure data may include one or more of but not limited to financial account information, user password information, security credential information, and personal data.

The method continues with step 288 where the processing module transmits the request to a first dispersed storage network (DSN) access portal. The DSN access portal may include one or more DS units, and/or a DS processing unit of a particular DSN system. Note that the processing module may determine one or more DSN access portals to access a reconstruction threshold number of coded data slices to reconstruct the requested secured data. The determination is based on one or more of but not limited to a user ID, a vault ID, a vault lookup, a predetermination, a command, and a message.

The method continues with step 290 where the processing module receives a first response from the first DSN access portal. The first response includes, for a data segment of the secure data, a first set of encoded data slices, wherein the first set of encoded data slices includes less than a reconstruction threshold number of encoded data slices. Note that the first response is based on a security level associated with the user ID and security parameters of the secure data. The security parameters may include one or more of but not limited to a secrecy level of data, an amount of data, encryption information regarding the data, codec information regarding the data, and error coding dispersal storage function parameters. The method of the DSN access portal to determine the first response is discussed in greater detail with reference to FIG. 14.

The method continues with step 292 where the processing module generates a second request to access the secure data in response to receiving the first response. The second request includes the user ID and the at least one object name for the secure data.

In addition, the second request may include a representation of the first response. The representation may include a list of slices received so far, required slices, the first response, a summary of the first response, and/or a DSN access portal identifier. For example, the second request may include slice names of the encoded data slices received in the first response. The method continues with step 294 where the processing module transmits the second request to a second DSN access portal.

The method continues with step 296 when the processing module receives a second response from the second DSN access portal. The second response includes, for the data segment of the secure data, a second set of encoded data slices, wherein the second set of the encoded data slices includes less than the reconstruction threshold number of encoded data slices. The second response is based on the security level associated with the user ID, the first response, and the security parameters of the secure data. For example, the second response may include the remaining required encoded data slices to reconstruct the data segment when the security level associated with the user ID is favorable (e.g., a very trusted user ID) and/or when the security parameters of the secure data is favorable (e.g., a low security risk).

The method continues with step 298 where the processing module determines if a reconstruction threshold number of encoded data slices have been received (e.g., by comparing the number of received slices to the reconstruction threshold number). The method continues to step 300 where the processing module obtains more encoded data slices. The processing module obtains more encoded data slices in a similar manner as described above where the processing module generates a third or more request to access secure data and transmits the third or more requests to access secure data to a third or more DSN access portals. The processing module receives a third or more responses from the third or more DSN the access portals. The method repeats back to step 298 where the processing module determines if a reconstruction threshold number of encoded data slices have been received. The method continues to step 302 when the processing module determines that enough (e.g. a reconstruction threshold number) of encoded data slices have been received. The method continues with step 302 where the processing module decodes the encoded data slices to reconstruct the data (e.g., one or more data segments of the secure data).

Figure 14:
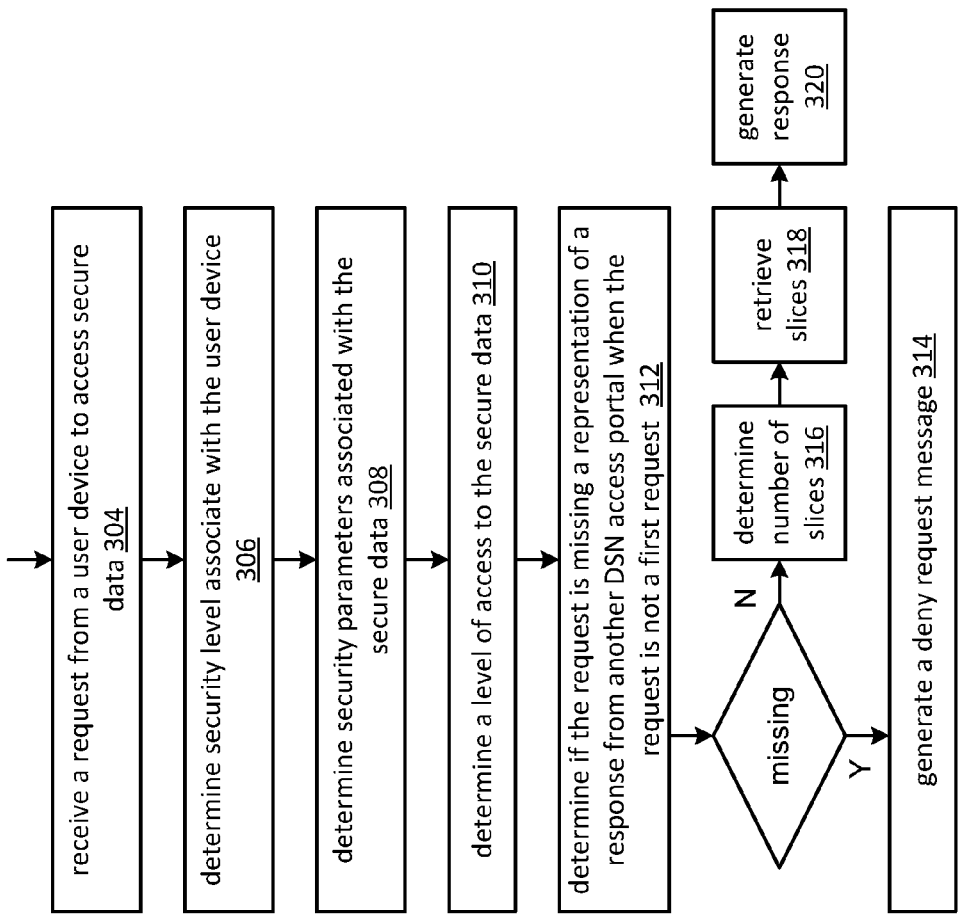
FIG. 14 is another flowchart illustrating secure access of dispersedly stored data by a processing module.

FIG. 14 is another flowchart illustrating secure access of dispersedly stored data by a processing module. The processing module may be implemented in a user device, a DS processing unit, a DSN access portal, a DS managing unit, a storage integrity processing unit, the transaction unit, and/or a DS unit. Note that the DSN access portal may be implemented in a DS processing unit as an interface between the user device and one or more DSN memories. For example, the processing module is implemented in the DS processing unit. The method begins with step 304 where the processing module receives a request from a user device to access secure data. Alternatively, the request may be received from the DS processing unit, the DS managing unit, storage integrity processing unit, the transaction unit, and/or a DS unit. The request includes a user identification code (ID) and at least one object name (e.g., file name, block ID) for the secure data.

The method continues with step 306 where the processing module determines a security level associated with the user device. The determination may be based on one or more of but not limited to the user ID, communicating with the DS managing unit to obtain and/or verify the security level associated with the user device, a vault lookup, a command, a predetermination, and a message. For example, the processing module communicates with the DS managing unit to retrieve a security level of three (of ten) that is associated with the user ID. In an instance, the security level of three of ten indicates that user ID does not have broad access to secure data. In another instance, a security level of ten of ten indicates that the user ID has broad access to secure data.

The method continues with step 308 where the processing module determines security parameters associated with the secure data. The determination may be based on one or more of but not limited to the secure data, the object name, communicating with the DS managing unit to obtain and/or verify the security parameters associated with the secure data, a secrecy level of data, an amount of data, codec information regarding the data, error coding dispersal storage function parameters, a vault lookup, a command, a predetermination, and a message. For example, the processing module communicates with the DS managing unit to retrieve a security parameter of three (of ten) that is associated with the secure data. In an instance, the security parameter of three of ten indicates that access to the secure data is not very restricted. In another instance, a security parameter of ten of ten indicates that access to the secure data is very restricted.

The method continues with step 310 where the processing module determines a level of access to the secure data. The determination is based on one or more of but not limited to the user ID, object name, the security level associated with the user device, the security parameters associated with the secure data, a vault lookup, a predetermination, a command, and a message. For example, the processing module determines the level of access to be partial (e.g., less than a reconstruction threshold number of slices will be provided to the requester) when the security parameters are greater than the security level. In another example, the processing module determines the level of access be full (e.g., at least a reconstruction threshold number of slices will be provided to the requester) when the security level is greater than security parameters.

The method continues with step 312 where the processing module determines if the request is missing a representation of a response from another DSN access portal when the request is not a first request. In other words, the processing module determines whether the request includes the representation of a response from another computing device and when the request does not include the representation, the processing module determines whether the request is the first request. Note that the representation of the response from another DSN access portal (e.g., a computing device) may indicate how many slices (e.g., which slice names) have been previously retrieved from one or more different DSN access portals. Note that the request may further include an indicator of how many DSN access portals have been accessed to access the secure data. In an instance, the indicator may be zero when the request is the first request.

The method branches to step 316 when the processing module determines that the request is not missing a representation of the response from another DSN access portal when the request is not the first request. Note that the method always branches to step 316 when the request is the first request. The method continues to step 314 when the processing module determines that the request is missing the representation of the response from another DSN access portal when the request is not the first request. The method ends with step 314 where the processing module generates a deny request message. The message may include one or more of but not limited to the request, the user ID, a DSN access portal identifier, the security level associated with the user device, the security parameters associated with the secure data, the level of access, a denial reason indicator, and a command. In addition, the processing module may send the deny request message to the requester (e.g. the user device) and/or the DS managing unit.

When the processing module determines that the request is not missing a representation of the response from another DSN access portal when the request is not the first request, the method continues with step 316 where the processing module determines a number of encoded data slices (a set) when the access level is partial (e.g., less than a construction threshold number). The determination of the number of slices of a set of encoded data slices to include it is based on one or more of but not limited to a variable function of the security parameters and the security level associated with the user ID, the user ID, the object name, the security parameters, the security level, the level of access, a vault lookup, a predetermination, a message, and a command. For example, the processing module may determine to provide four different slices in processing a second request, when six slices were previously provided in a first response from a different DSN access portal when the pillar width is 16, the reconstruction threshold is 10, the security level is six, and the security parameters is five.

The method continues with step 318 where the processing module retrieves the set of encoded data slices from dispersed storage units, wherein the set of encoded data slices includes less than a reconstruction threshold number of encoded data slices. Next, at step 320 processing module generates a response that includes the set of encoded data slices. In addition, the processing module sends the response to the requester.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for a computing device to securely access dispersedly stored data, the method comprises:
generating, by a processor of the computing device, a request to access secure data, wherein the request includes a user identification code (ID) and at least one object name for the secure data and wherein the secure data includes one or more of: financial account information, user password information, security credential information, and personal data;
transmitting the request to a first dispersed storage network (DSN) access portal;
receiving, from the first DSN access portal, a first response that includes, for a data segment of the secure data, a first set of encoded data slices, wherein the first set of encoded data slices includes less than a reconstruction threshold number of encoded data slices, wherein the first response is based on security level associated with the user ID and security parameters of the secure data, and wherein the security parameters includes at least one of a secrecy level of data, an amount of data, encryption information regarding the data, codec information regarding the data, and error coding dispersal storage function parameters;
generating a second request to access the secure data in response to receiving the first response, wherein the second request includes the user ID and the at least one object name for the secure data;
transmitting the second request to a second DSN access portal;
receiving, from the second DSN access portal, a second response that includes, for the data segment of the secure data, a second set of encoded data slices, wherein the second set of encoded data slices includes less than the reconstruction threshold number of encoded data slices, wherein the second response is based on the security level associated with the user ID, the first response, and the security parameters of the secure data; and
when the first and second sets of encoded data slices include at least the reconstruction threshold number of encoded data slices, decoding the first and second sets of encoded data slices to reconstruct the data segment.

2. The method of claim 1, wherein the second request further comprises a representation of the first response.

3. The method of claim 1 further comprises:
when the first and second sets of encoded data slices do not include at least the reconstruction threshold number of encoded data slices:
generating a third request to access the secure data in response to receiving the first response and the second response, wherein the third request includes the user ID and the at least one object name for the secure data;
transmitting the third request to a third DSN access portal;
receiving, from the third DSN access portal, a third response that includes, for the data segment of the secure data, a third set of encoded data slices, wherein the third set of encoded data slices includes less than the reconstruction threshold number of encoded data slices, wherein the third response is based on the security level associated with the user ID, the first response, the second response, and the security parameters of the secure data; and
when the first, second, and third sets of encoded data slices include at least the reconstruction threshold number of encoded data slices, decoding the first, second, and third sets of encoded data slices to reconstruct the data segment.

4. A computing device comprises:
an interface; and
a hardware processing module operable to:
generate a request to access secure data, wherein the request includes a user identification code (ID) and at least one object name for the secure data and wherein the secure data includes one or more of: financial account information, user password information, security credential information, and personal data;
transmit, via the interface, the request to a first dispersed storage network (DSN) access portal;
receive, from the first DSN access portal via the interface, a first response that includes, for a data segment of the secure data, a first set of encoded data slices, wherein the first set of encoded data slices includes less than a reconstruction threshold number of encoded data slices, and wherein the first response is based on security level associated with the user ID and security parameters of the secure data, and wherein the security parameters includes at least one of a secrecy level of data, an amount of data, encryption information regarding the data, codec information regarding the data, and error coding dispersal storage function parameters;
generate a second request to access the secure data in response to receiving the first response, wherein the second request includes the user ID and the at least one object name for the secure data;
transmit, via the interface, the second request to a second DSN access portal;
receive, from the second DSN access portal via the interface, a second response that includes, for the data segment of the secure data, a second set of encoded data slices, wherein the second set of encoded data slices includes less than the reconstruction threshold number of encoded data slices, wherein the second response is based on the security level associated with the user ID, the first response, and the security parameters of the secure data; and
when the first and second sets of encoded data slices include at least the reconstruction threshold number of encoded data slices, decode the first and second sets of encoded data slices to reconstruct the data segment.

5. The computing device of claim 4, wherein the second request further comprises a representation of the first response.

6. The computing device of claim 4, wherein the hardware processing module further functions to:
when the first and second sets of encoded data slices do not include at least the reconstruction threshold number of encoded data slices:
generate a third request to access the secure data in response to receiving the first response and the second response, wherein the third request includes the user ID and the at least one object name for the secure data;
transmit, via the interface, the third request to a third DSN access portal;
receive, from the third DSN access portal via the interface, a third response that includes, for the data segment of the secure data, a third set of encoded data slices, wherein the third set of encoded data slices includes less than the reconstruction threshold number of encoded data slices, wherein the third response is based on the security level associated with the user ID, the first response, the second response, and the security parameters of the secure data; and when the first, second, and third sets of encoded data slices include at least the reconstruction threshold number of encoded data slices, decode the first, second, and third sets of encoded data slices to reconstruct the data segment.

* * * * *